(12) United States Patent
Davydov et al.

(10) Patent No.: US 9,380,090 B2
(45) Date of Patent: Jun. 28, 2016

(54) NETWORK ASSISTED INTERFERENCE CANCELLATION AND SUPPRESSION WITH RESPECT TO INTERFERING CONTROL CHANNEL TRANSMISSIONS

(71) Applicant: Intel IP Corporation, Santa Clara, CA (US)

(72) Inventors: Alexei Davydov, Nizhny Novgorod (RU); Gregory Morozov, Nizhny Novgorod (RU); Seunghee Han, Cupertino, CA (US)

(73) Assignee: Intel IP Corporation, Santa Clara, CA (US)

( * ) Notice: Subject to any disclaimer, the term of this patent is extended or adjusted under 35 U.S.C. 154(b) by 131 days.

(21) Appl. No.: 14/141,220

(22) Filed: Dec. 26, 2013

(65) Prior Publication Data

US 2014/0293890 A1 Oct. 2, 2014

Related U.S. Application Data

(60) Provisional application No. 61/806,821, filed on Mar. 29, 2013.

(51) Int. Cl.
*H04L 5/00* (2006.01)
*H04L 29/06* (2006.01)
(Continued)

(52) U.S. Cl.
CPC .............. *H04L 65/4092* (2013.01); *H04B 1/56* (2013.01); *H04B 7/0417* (2013.01); *H04B 7/0456* (2013.01); *H04B 7/0617* (2013.01); *H04B 7/0634* (2013.01); *H04L 1/1864* (2013.01); *H04L 5/0048* (2013.01); *H04L 5/0051* (2013.01); *H04L 5/0057* (2013.01); *H04L 5/0073* (2013.01); *H04L 5/0085* (2013.01); *H04L 65/601* (2013.01); *H04L 65/607* (2013.01); *H04L 65/608* (2013.01); *H04L 65/80* (2013.01); *H04L 67/02* (2013.01); *H04M 1/72522* (2013.01); *H04M 1/72572* (2013.01); *H04W 4/021* (2013.01); *H04W 8/02* (2013.01); *H04W 8/06* (2013.01); *H04W 24/00* (2013.01); *H04W 24/02* (2013.01); *H04W 24/10* (2013.01); *H04W 28/0205* (2013.01); *H04W 28/0226* (2013.01); *H04W 28/0289* (2013.01); *H04W 28/085* (2013.01); *H04W 28/20* (2013.01); *H04W 36/0005* (2013.01);
(Continued)

(58) Field of Classification Search
None
See application file for complete search history.

(56) References Cited

U.S. PATENT DOCUMENTS

2009/0274202 A1  11/2009  Hanke et al.
2011/0274097 A1  11/2011  Zhang et al.
(Continued)

OTHER PUBLICATIONS

3GPP, "Technical Specification Group Radio Access Network; Evolved Universal Terrestrial Radio Access (E-UTRA); Physical layer procedures (Release 10)," 3GPP TS 36.213 V10.9.0 (Feb. 2013), Mar. 15, 2013, Lte Advanced, 126 pages.
(Continued)

*Primary Examiner* — Feben M Haile
(74) *Attorney, Agent, or Firm* — Schwabe, Williamson & Wyatt, P.C.

(57) ABSTRACT

Embodiments of the present disclosure describe systems and methods for mitigating interference in wireless networks. Various embodiments may include signaling of control channel information associated with an interfering cell and utilization of the control channel information to mitigate interference. Other embodiments may be described and/or claimed.

7 Claims, 9 Drawing Sheets

(51) Int. Cl.
| | |
|---|---|
| H04B 1/56 | (2006.01) |
| H04W 48/16 | (2009.01) |
| H04W 56/00 | (2009.01) |
| H04W 76/02 | (2009.01) |
| H04W 36/30 | (2009.01) |
| H04B 7/04 | (2006.01) |
| H04W 24/00 | (2009.01) |
| H04W 36/26 | (2009.01) |
| H04W 48/18 | (2009.01) |
| H04W 24/10 | (2009.01) |
| H04W 36/00 | (2009.01) |
| H04W 36/22 | (2009.01) |
| H04L 1/18 | (2006.01) |
| H04W 24/02 | (2009.01) |
| H04W 72/04 | (2009.01) |
| H04W 72/08 | (2009.01) |
| H04W 28/20 | (2009.01) |
| H04L 29/08 | (2006.01) |
| H04M 1/725 | (2006.01) |
| H04W 4/02 | (2009.01) |
| H04W 8/02 | (2009.01) |
| H04W 8/06 | (2009.01) |
| H04W 28/02 | (2009.01) |
| H04B 7/06 | (2006.01) |
| H04W 48/06 | (2009.01) |
| H04W 28/08 | (2009.01) |
| H04W 36/08 | (2009.01) |
| H04W 48/12 | (2009.01) |
| H04W 88/08 | (2009.01) |
| H04W 84/04 | (2009.01) |
| H04W 88/10 | (2009.01) |
| H04W 84/12 | (2009.01) |
| H04W 88/02 | (2009.01) |

(52) U.S. Cl.
CPC ............ *H04W 36/22* (2013.01); *H04W 36/26* (2013.01); *H04W 36/30* (2013.01); *H04W 48/06* (2013.01); *H04W 48/16* (2013.01); *H04W 48/18* (2013.01); *H04W 56/001* (2013.01); *H04W 72/0446* (2013.01); *H04W 72/082* (2013.01); *H04W 76/021* (2013.01); *H04W 76/023* (2013.01); *H04W 76/025* (2013.01); *H04L 5/0007* (2013.01); *H04W 36/08* (2013.01); *H04W 48/12* (2013.01); *H04W 84/042* (2013.01); *H04W 84/045* (2013.01); *H04W 84/12* (2013.01); *H04W 88/02* (2013.01); *H04W 88/08* (2013.01); *H04W 88/10* (2013.01); *Y02B 60/50* (2013.01)

(56) References Cited

U.S. PATENT DOCUMENTS

| | | |
|---|---|---|
| 2012/0113844 A1 | 5/2012 | Krishnamurthy |
| 2013/0005269 A1 | 1/2013 | Lindoff et al. |
| 2013/0114545 A1* | 5/2013 | Papsakellariou et al. ...... 370/329 |
| 2013/0194951 A1* | 8/2013 | Kim et al. ................... 370/252 |
| 2014/0036747 A1* | 2/2014 | Nory et al. .................. 370/311 |

OTHER PUBLICATIONS

3GPP,"Technical Specification Group Radio Access Network; Evolved Universal Terrestrial Radio Access (E-UTRA); Physical Channels and Modulation (Release 11)," 3GPP TS 36.211 V11.2.0 (Feb. 2013), Mar. 15, 2013, Lte Advanced, 109 pages.
Notification of Transmittal of the International Search Report and Written Opinion mailed Aug. 14, 2014 from International Application No. PCT/US2014/032266.
Mediatek et al, "Study on Network-Assisted Interference Cancellation and Suppression for LTE," 3GPP TSG RAN Meeting #59, RP-130404, Agenda Item: 13.2, Feb. 26-Mar. 1, 2013, Vienna, Austria, 7 pages.
International Preliminary Report on Patentability mailed Oct. 8, 2015 from International Application No. PCT/US2014/032266.

* cited by examiner

NETWORK ASSISTED INTERFERENCE CANCELLATION AND SUPPRESSION WITH RESPECT TO INTERFERING CONTROL CHANNEL TRANSMISSIONS

CROSS-REFERENCE TO RELATED APPLICATIONS

This application claims priority to U.S. Provisional Application No. 61/806,821, filed 29 Mar. 2013 and entitled "ADVANCED WIRELESS COMMUNICATION SYSTEMS AND TECHNIQUES," which is hereby incorporated by reference in its entirety.

FIELD

Embodiments of the present disclosure generally relate to the field of wireless communication, and more particularly, to interference mitigation.

BACKGROUND

Downlink coordinated multi-point (DL CoMP) was introduced in Release 11 of the $3^{rd}$ Generation Partnership Project (3GPP) Long Term Evolution (LTE) standard to address the issue of throughput performance for cell-edge users. While DL CoMP may increase throughput performance for cell-edge users, these users may still face interference from the neighboring cells.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware components that provide the described functionality.

Embodiments of the present disclosure describe provision, to a user equipment (UE), control channel information related to an interfering control channel. The UE may use this information to estimate an interference profile associated with the interfering control channel. This interference profile estimation may then be used by the UE for interference mitigation.

Figure 1:
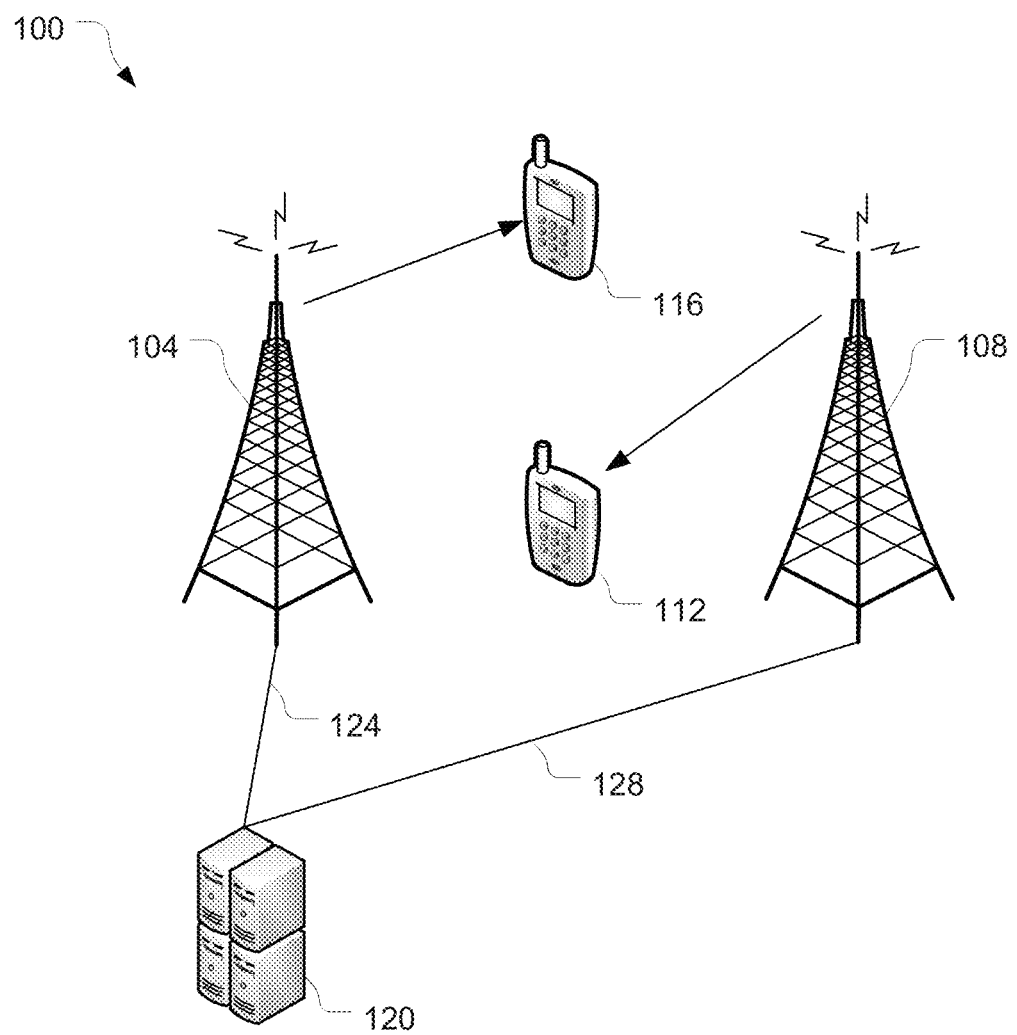
FIG. 1 illustrates an example wireless communication network in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) network (or an LTE-Advanced (LTE-A) network) such as an evolved universal terrestrial radio access network (E-UTRAN). The network 100 may include access nodes, for example, enhanced node base station (eNB) 104 and eNB 108, configured to wirelessly conmmunicate with user equipment (UE), such as UE 112 and UE 116. The eNBs 104 and 108 may be connected with core network equipment 120 through respective backhaul links 124 and 128. In some embodiments, the backhaul links may be, for example, high speed X2 interfaces. While the present embodiment describes the access nodes as eNBs, other embodiments may include other types of access nodes such as, but not limited to, remote radio heads (RRHs), base stations, or other transmission points.

The eNBs 104 and 108 may provide radio coverage for respective cells. The cell size may be based on, for example, transmission power capabilities of the eNBs 104 and 108. The eNBs 104 and 108 may each have generally the same transmission power capabilities as one another or, alternatively, one of the eNBs may have relatively lower transmission power capabilities. For example, in one embodiment the eNB 104 may be a relatively high-power access node such as a macro eNB, while the eNB 108 may be relatively low-power access node, for example, a pico eNB and/or a femto eNB.

In some embodiments, the network 100 may be a heterogeneous network (for example, having macro-, pico-, and/or femto-eNBs) to achieve cell-splitting gains and/or may use multiple user multiple input multiple output (MIMO) communications. In both scenarios, co-channel interference, either from inter-cell or co-scheduled, intra-cell users, may be a dominant limiting factor for achieving higher network capacity. To some extent, co-channel interference may be mitigated at the network side by, for example, using CoMP to avoid interference at the transmitting eNB. Interference mitigation may additionally/alternatively be employed at the UE side by accounting for spatial and signal properties of the interference, which may provide promising gains in spectral efficiency. As used herein, interference mitigation may include interference cancellation and/or suppression.

Embodiments described herein provide for further enhancements for interference mitigation at the UE side that may be achieved through advanced receiver algorithms. The receiver algorithms may be supported by providing the UE 112 with additional information about interference structure. For example, as will be described in further detail, receiver circuitry of a UE may be provided with side knowledge of a control channel that causes interference such as, but not limited to, power boosting information, RE loading and mapping information, antenna port information, etc. With such information, the receiver circuitry may improve performance of various physical control channels such as physical downlink control channel (PDCCH), enhanced physical downlink control channel (EPDCCH), physical hybrid-ARQ indicator channel (PHICH), physical control format indicator channel (PCFICH), etc.

In some embodiments, the UE 112 may be provided with control channel information to facilitate measurement of channels on which interfering signals are received in addition to measuring channels on which the useful signal is received. This may, for example, facilitate the use of advanced receivers, for example, maximum likelihood detection (ML) MIMO receivers, used in network-assisted interference cancellation and suppression (NAICS) systems.

Various transmission modes have been defined in LTE to allow for the ability to adjust the type of multi-antenna technique to use according to, for example, a particular radio environment. The different transmission modes vary in number of layers, antenna ports used, type of reference signal, and precoding type.

In 3GPP TS 36.213, a relationship is defined between channel energy per resource element (EPRE) and UE-specific RS EPRE only for the physical downlink shared channel (PDSCH). "For transmission mode 9, if UE-specific RSs are present in the [physical resource blocks] PRBs upon which the corresponding PDSCH is mapped, the UE may assume the ratio of PDSCH EPRE to UE-specific RS EPRE within each OFDM symbol containing UE-specific RS is 0 dB for number of transmission layers less than or equal to two and −3 dB otherwise." 3GPP TS36.213, v10.9.0 (2013-20), section 5.2. However, the PDCCH/EPDCCH may be scheduled with EPRE different from EPRE of CRS/UE-specific RS. Furthermore, PDCCH/EPDCCH regions may be partially loaded so they may not create any interference on some of the REs of the PDCCH/EPDCCH of the victim UEs, e.g., a UE whose communication with a serving access node suffers from interference from the interfering PDCCH/EPDCCH. Given sensitivities of an ML MIMO receiver to such variances, present embodiments describe advanced receiver structures and corresponding signaling assistance to account for such variances and to facilitate effectiveness of NAICS systems.

Figure 2:
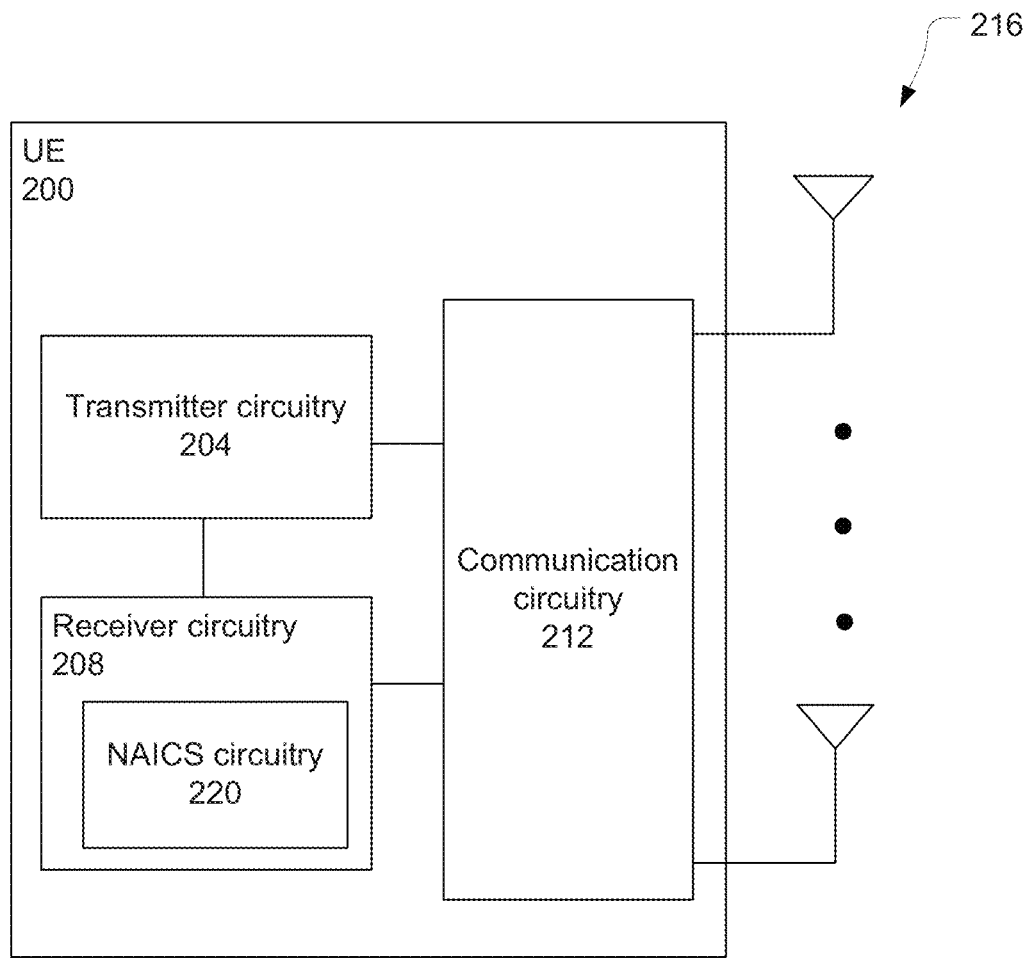
FIG. 2 is a block diagram of an illustrative user equipment (UE) in accordance with various embodiments.

FIG. 2 illustrates a UE 200 in accordance with some embodiments. The UE 200 may be similar to, and substantially interchangeable with, UEs 112 or 116 of FIG. 1. The UE 200 may include transmitter circuitry 204, receiver circuitry 208, communication circuitry 212, and one or more antennas 216 coupled with each other at least as shown.

Briefly, the communication circuitry 212 may be coupled with the antennas 216 to facilitate over-the-air communication of signals to/from the UE 200. Operations of the communication circuitry 212 may include, but is not limited to, filtering, amplifying, storing, modulating, demodulating, transforming, etc.

The transmitter circuitry 204 may be coupled with the communication circuitry 212 and may be configured to provide signals to the communication circuitry 212 for transmission by the antennas 216. In various embodiments, the transmitter circuitry 204 may be configured to provide various signal processing operations on the signal to provide the signal to the communication circuitry with appropriate characteristics.

The receiver circuitry 208 may be coupled with the communication circuitry 212 and may be configured to receive signals from the communication circuitry 212 for transmission to other components of the UE 200 and/or for internal processing by the receiver circuitry 208. In some embodiments, the receiver circuitry 208 may include NAICS circuitry 220 for determining an interference profile associated with an interfering control channel and mitigate interference on a received signal based on the interference profile.

Figure 9:
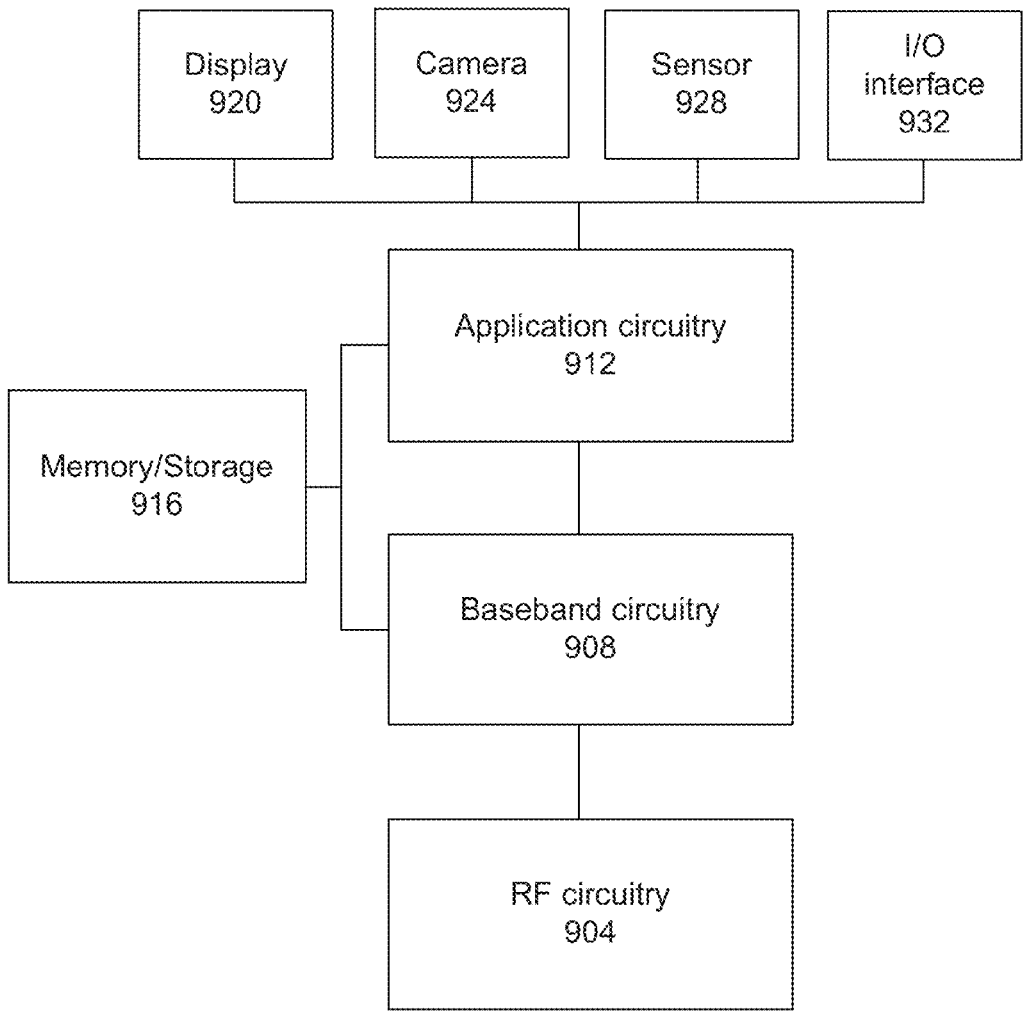
FIG. 9 is a block diagram of an example computing device that may be used to practice various embodiments described herein.

Some or all of the communication circuitry 212, transmitter circuitry 204, and/or the receiver circuitry 208 may be included in, for example, radio frequency (RF) circuitry or baseband circuitry as described below with respect to FIG. 9.

Figure 3:
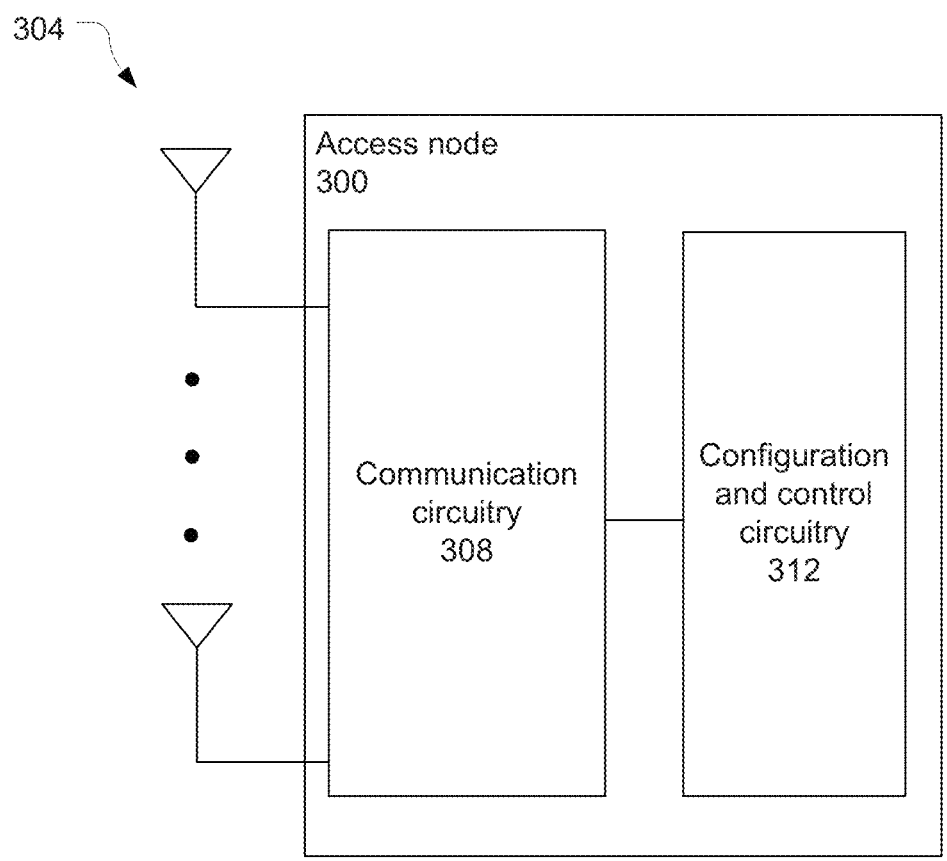
FIG. 3 is a block diagram of an illustrative access node in accordance with various embodiments.

FIG. 3 illustrates an access node 300 in accordance with some embodiments. In some embodiments, the access node 300 may be similar to and substantially interchangeable with eNBs 104 or 108.

The access node 300 may include one or more antennas 304, communication circuitry 308, and configuration and control circuitry 312 coupled with each other at least as shown.

Similar to communication circuitry 212, communication circuitry 308 may be coupled with the antennas 304 to facilitate over-the-air communication of signals to/from the access node 300.

The configuration and control circuitry 312 may transmit configuration and control information to UEs of a serving cell. The configuration and control information may include, for example, downlink channel information, downlink control information (DCI), radio resource control (RRC) configuration information, etc. The configuration and control circuitry 312 may further transmit configuration and control information to other access nodes over backhaul links. This may be done to facilitate CoMP operation.

Some or all of the communication circuitry 308 and/or the configuration and control circuitry 312 may be included in, for example, RF circuitry or baseband circuitry as described below with respect to FIG. 9.

Figure 4:
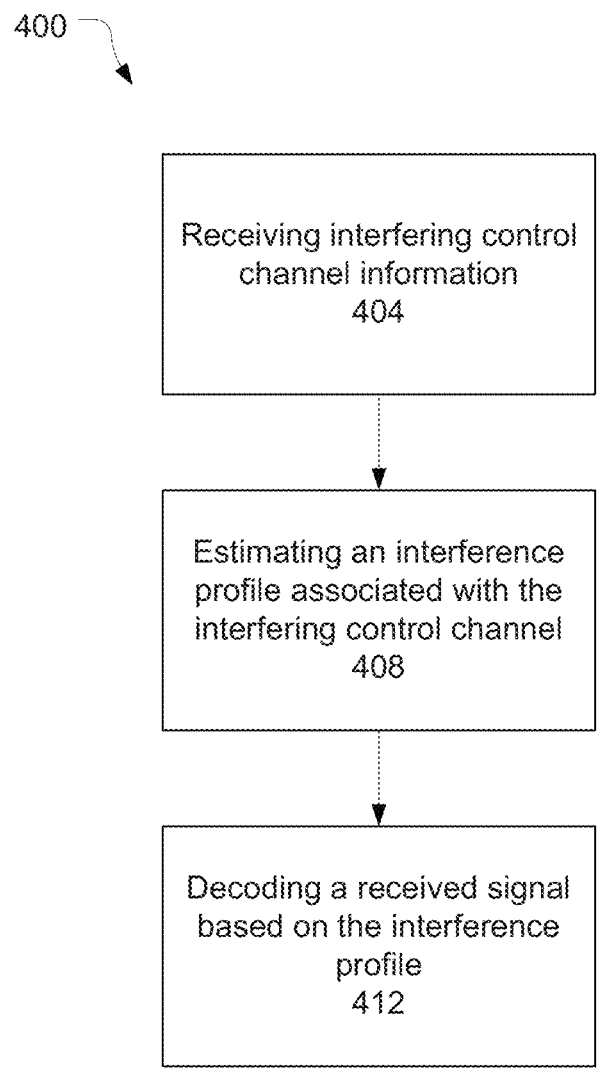
FIG. 4 is a flowchart describing a method in accordance with various embodiments.

FIG. 4 illustrates a method 400 in accordance with some embodiments. The method 400 may be performed by a UE such as UE 200. In some embodiments, the UE may include and/or have access to one or more computer-readable media having instructions stored thereon, that, when executed, cause the UE to perform the method 400. The UE may additionally/alternatively have circuitry configured to perform some or all of the operations described with respect to the method 400.

The method 400 may include, at 404, receiving interfering control channel information. In some embodiments, the receiving at 404 may be done by communication circuitry of the UE and may then be provided to the receiver circuitry and, in particular, to the NAICS circuitry. In some embodiments, the interference channel information may be received in a semi-static configuration operation in which a serving access node configures a UE by transmitting configuration information using higher layer signaling, such as radio resource signaling (RRC) signaling. The interfering control channel information may originate from a neighbor access node (also referred to as an "interfering access node"), which transmits the interfering control channel information to the serving access node, which then relays the information to the UE. In some embodiments, the UE may also receive serving control channel information from the serving access node.

The method may include, at 408, estimating an interference profile associated with the interfering control channel. The estimating of the interference profile may be done by the NAICS circuitry of the receiver of the UE. In some embodiments, the interference profile may be estimated based on the interfering control channel information received at 404.

The method may further include, at 412, decoding a received signal based on the interference profile. In some embodiments, the receiver circuitry will subtract interfering signals from a received signal in order to recover a desired signal, for example, a serving control channel signal. The decoding of the received signal is described in further detail herein with respect to various embodiments.

Figure 5:
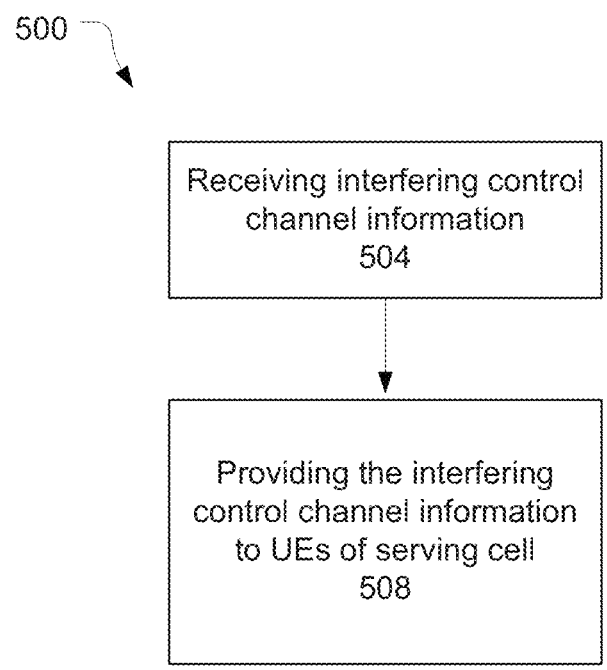
FIG. 5 is a flowchart describing a method in accordance with various embodiments.

FIG. 5 illustrates a method 500 in accordance with some embodiments. The method 500 may be performed by an access node such as eNB 104 or 108. In some embodiments, the access node may include and/or have access to one or more computer-readable media having instructions stored thereon, that, when executed, cause the access node to perform the method 500. The access node may additionally/alternatively have circuitry configured to perform some or all of the operations described with respect to the method 500.

The method 500 may include, at 504, receiving interfering control channel information. In some embodiments, the receiving at 504 may be done by communication circuitry of the access node and provided to the control and configuration circuitry. In some embodiments, the interfering control channel information may be received by a serving access node from an interfering access node over a backhaul link. The interfering control channel information may be received in a semi-static configuration operation.

The method 500 may further include, at 508, providing the interfering control channel information to UEs of a serving cell. The providing may be done as part of a semi-static configuration operation by, for example, radio resource signaling between the serving access node and the UE. In some embodiments, the serving access node may additionally provide serving control channel information to the UEs of the serving cell.

The nature, provision, and use of the control channel information may be explained below with respect to various embodiments.

In some embodiments, the control channel information may allow for receiver circuitry, for example, receiver circuitry 208, to use ML techniques for PDCCH/EPDDCH. Receiver circuitry employing ML techniques, which may be referred to as an ML receiver, may determine an estimate of a transmitted signal by scanning all possible signal combinations on serving and interfering cells in an attempt to minimize a squared distance between a received signal and hypothetically transmitted signals. The signal combination that minimizes the squared distance may then be considered to be the transmitted signals on the serving and interfering cells. While a UE may estimate serving and interfering channels, it does not know boosting values used by the serving and interfering access nodes. Thus, ML operation may be complicated.

To assist the use of ML techniques by the receiver circuitry, some embodiments may signal, in the control channel information, power boosting information related to control channels of the interfering and/or serving cells. In particular, in accordance with some embodiments, a serving access node may provide a UE in a serving cell with a power boosting set including one or more boosting values. In some embodiments, the boosting values may be provided as EPRE ratios between PDCCH/EPDCCH and reference signals of PDCCH/EPDCCH (CRS and UE-specific RS) for both serving and interfering cells. A power boosting set may include one or more power boosting values that may be used for PDCCH/EPDCCH. In some embodiments, a power boosting set may be provided for a PDCCH/EPDCCH of a serving cell and for a PDCCH/EPDCCH of an interfering cell. The power boosting sets may be the same or different in the serving and interfering cells. In some embodiments, power boosting sets may additionally/alternatively apply to other control channels. For example, a power boosting set may be provided for PHICH and PCFICH of the serving cell; and power boosting sets may be provided for corresponding control channels of interfering cell, such as PDCCH/EPDCCH, PCFICH, and PHICH.

Figure 6:
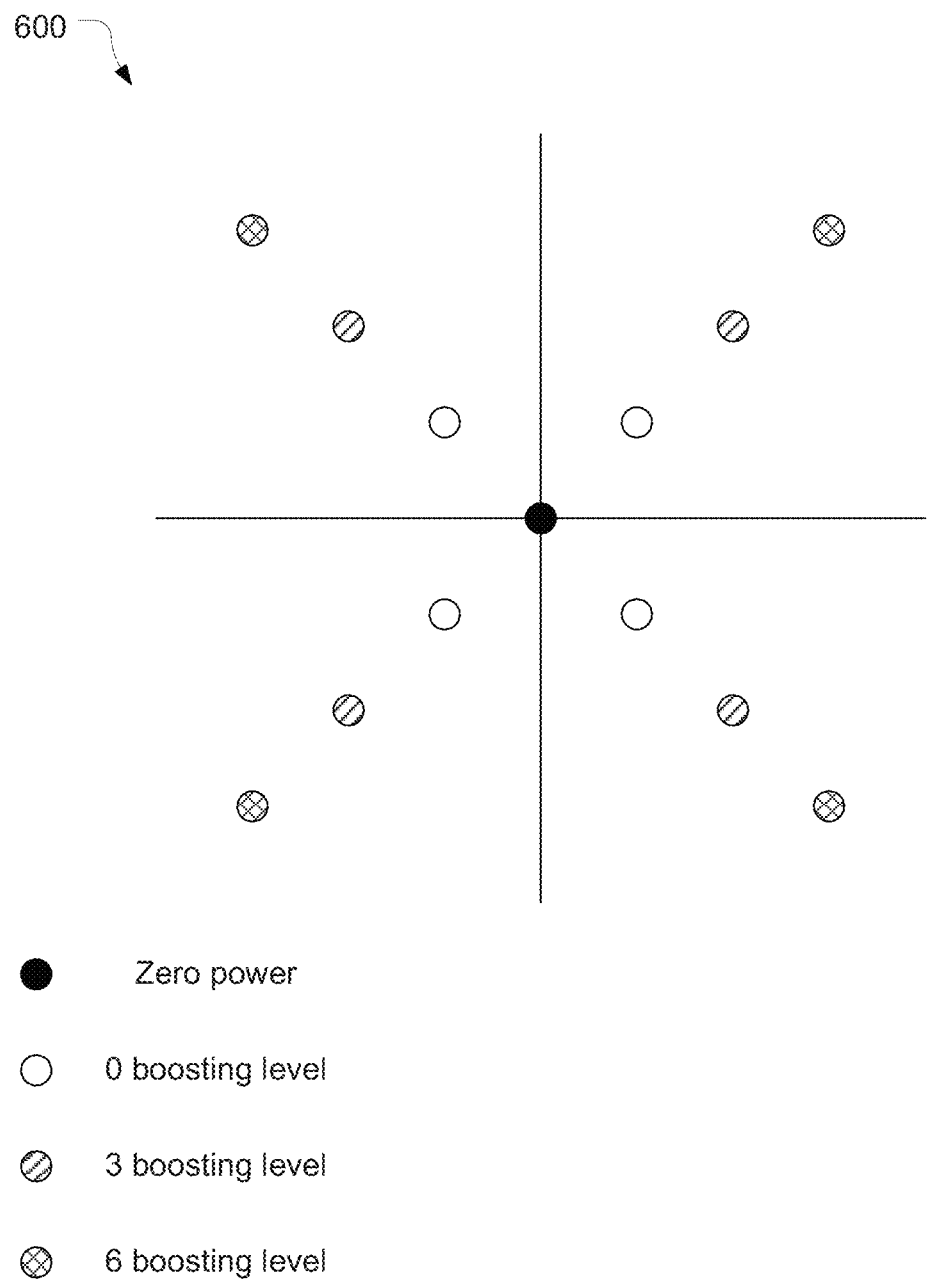
FIG. 6 illustrates an extended quadrature phase shift keying constellation in accordance with various embodiments.

NAICS circuitry, e.g., NAICS circuitry 220, may use these boosting sets to determine an extended quadrature phase shift keying (QPSK) constellation for selection of optimal combinations for the PDCCH/EPDCCH signals from serving and interfering access nodes. For example, FIG. 6 illustrates an extended QPSK constellation 600 in accordance with some embodiments. The QPSK constellation 600 illustrates possible signal points that can be used on serving or interfering PDCCH/EPDCCH given signaled power boosting values of {0,3,6} dB relative to reference signals of PDCCH/EPDCCH. In addition a spare point (with zero power) is possible for an interfering signal. The receiver circuitry may then jointly decode serving and interfering control channels based on the extended QPSK constellation. For example, the receiver circuitry may utilize an ML decoding algorithm to perform a search over the discrete signals of the extended QPSK constellation for the serving and interfering signals.

In some embodiments, the power boosting information may include an indication that power boosting is not used on PDCCH/EPDCCH of serving and/or interfering cells. In some embodiments, the power boosting values may be selected from a list that includes: −6, −4.77, −3, −1.77, 0, 1, 2, and 3 dB relative to reference signals of PDCCH/EPDCCH. Other embodiments may use other power boosting values.

Figure 7:
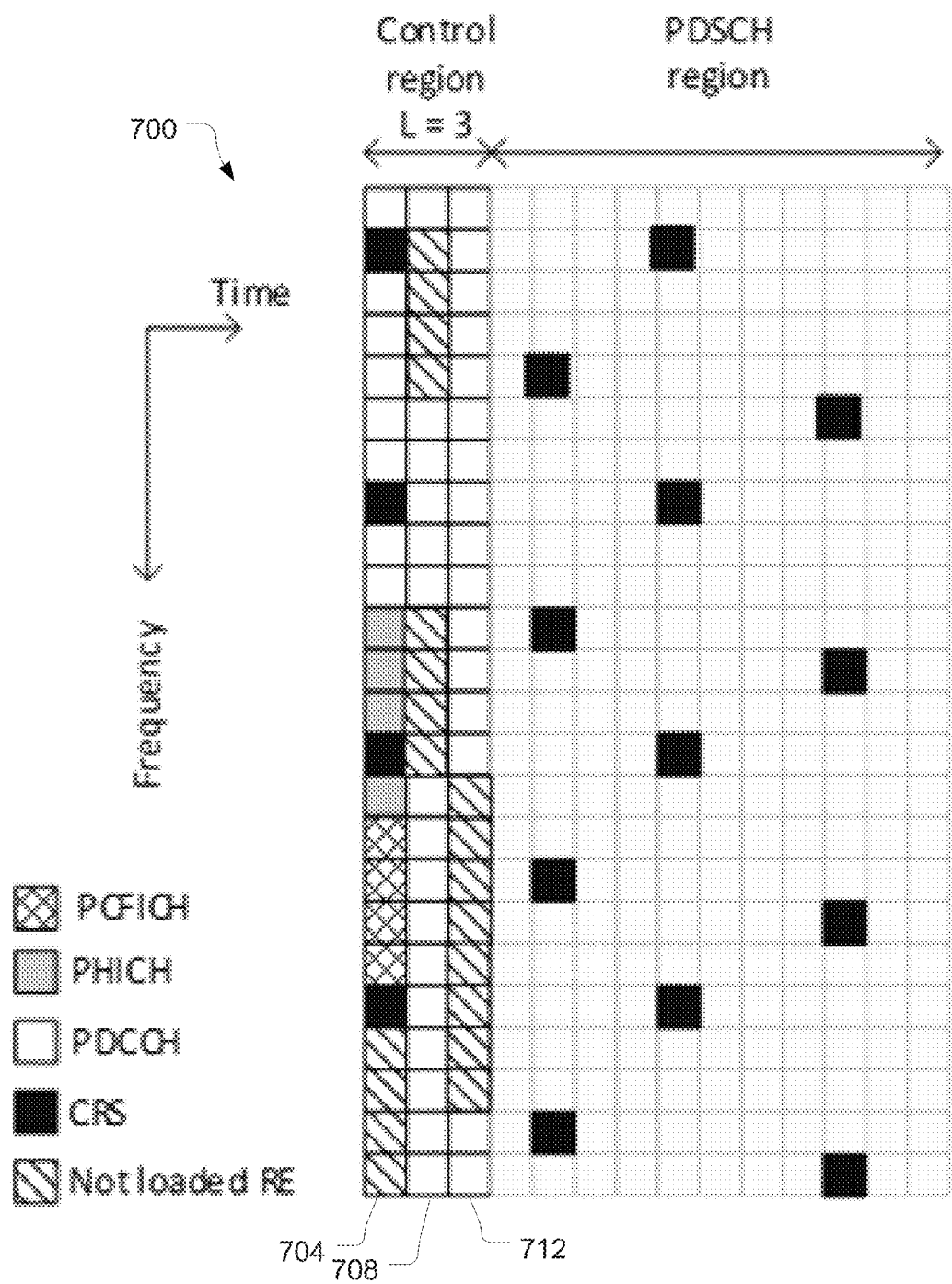
FIG. 7 illustrates a radio frame in accordance with various embodiments.

Due to the presence of CRS and other control channels, for example, physical hybrid-automatic repeat request indicator channel (PHICH) and physical control format indicator channel (PCFICH), the number of used resource elements may be larger on the first ODFM symbol than on other OFDM symbols of the PDCCH of the serving cell. See, for example, FIG. 7, which depicts a radio fram 700 with resource elements for different downlink physical control channels in accordance with some embodiments. As can be seen, a first OFDM symbol 704 includes REs having CRS, PHICH, PCFICH, and PDCCH, with only four REs that are not loaded. OFDM symbols 708 and 712 each have eight REs not loaded. Furthermore, the control channels other than the PDCCH, may borrow power from the PDCCH, with respect to OFDM symbol 704, if PDCCH power lending can be compensated on the OFDM symbols 708 and/or 712. Therefore, some embodiments may include, in the power boosting information, two or more PDCCH power boosting sets that may be used on different OFDM symbols of the control region for the serving and/or interference cells. For example, the power boosting information may include a first boosting set that may be used on a first OFDM symbol of the control region and a second boosting set, which is different from the first boosting set, that may be used on a second OFDM symbol of the control region.

In some embodiments, the control channel information may facilitate the receiver circuitry in calculation of optimized log-likelihood ratios (LLR) for mismatched PDCCH/EPDCCH receivers. Interference power may be difficult to estimate on the REs used for PDCCH/EPDCCH. This may be due, in part, to the fact that some of the REs of the interfering control channel are not loaded; therefore, the interference hit from the interfering cell becomes somewhat random. Because the estimation of interference power is difficult, the weighting of LLR bits by signal to interference plus noise ratio (SINR) before decoding, by a convolutional decoder in the case of control channels, may become inaccurate. Therefore, embodiments of the present disclosure redesign the LLR calculation procedure for the PDCCH-EPDCCH signals to account for the potential receiver mismatch.

Figure 8:
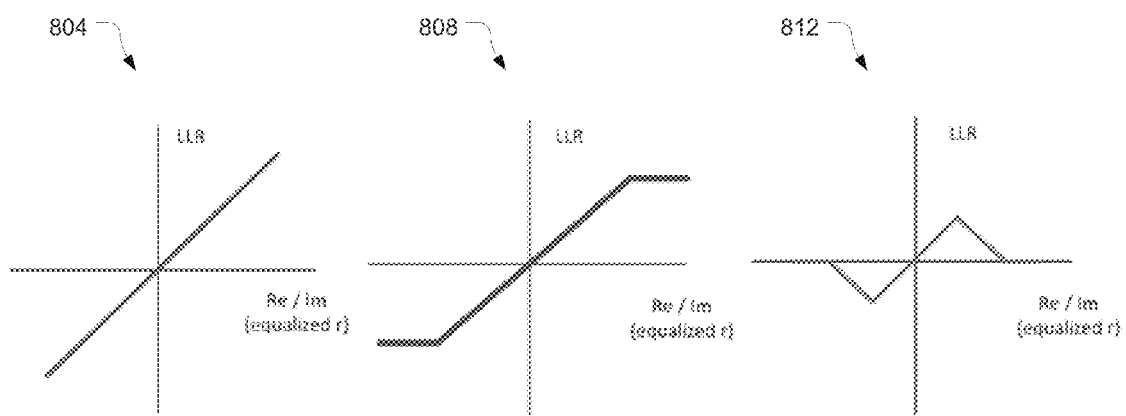
FIG. 8 illustrates various log-likelihood ratio functions in accordance with various embodiments.

FIG. 8 illustrates three LLR calculation functions in accordance with some embodiments. In particular, FIG. 8 illustrates functions 804, 808, and 812. Functions 804, 808, and 812, which graphically represent LLR values as a function of real-to-imaginary values of an equalized received signal r, may be performed by a first receiver, a second receiver, and a third receiver, respectively. The first receiver may be a conventional receiver, while the second and third receivers may be optimized receivers to mismatched interference assumptions. For purposes of the present disclosure, a optimized receiver to mismatched interference assumption may refer to a receiver unable to perform a sufficiently accurate estimation of interference power.

To assist operation of the receiver circuitry in a variety of situations, some embodiments provide that the control channel information include control region loading information of the interfering cell. This may be, for example, an indication of an average number of REs within a control region of a radio frame that are used for control channel or reference signal transmissions, or an average ratio of the number of used REs to the total number of REs in the control region. When the receiver circuitry receives the control region loading information, it may determine an interference profile associated with the control channel based on the loading information. The receiver circuitry may then decode a received signal by selecting a receiver that provides a desired LLR function, for example, the first, second, or third receiver, in order to provide decoding robustness in light of the probability of random interference hits given the present loading conditions.

In some embodiments, the receiver circuitry may jointly estimate the power boosting and the serving/interfering signals of PDCCH/EPDCCH without relying on the control channel information related to the interfering cell. This may be done in two ways.

Consider, for example, the following received signal model and one antenna port transmission:

$$y = \underbrace{h_1 \cdot b_1 s_1}_{\text{signal}} + \underbrace{\sum_{i=2}^{N_i+1} h_i \cdot b_i s_i}_{\text{interference}} + \underbrace{n}_{\text{noise}}, \quad \text{Equation 1}$$

where $h_1$ is equivalent channel for serving node, $h_i$ is equivalent channel for interfering node, $b_1$ is power boosting on serving PDCCH/EPDCCH, $b_i$ is power boosting on interference PDCCH/EPDCCHs, $s_1$ is useful on serving PDCCH/EPDCCH, $s_i$ is interfering on interference PDCCH/EPDCCHs, and $N_i$ is a number of interfering cells. A composite channel from the serving and interfering nodes may be defined as follows:

$$H = [h_1, \ldots h_{N_i+1}]. \quad \text{Equation 2}$$

The first way the receiver circuitry may jointly estimate the power boosting and the serving/interfering signals of PDCCH/EPDCCH without relying on the control channel information related to the interfering cell may be described as follows. For a given signal hypothesis $s = [s_1, \ldots, s_{N_i+1}]$ on serving and interfering nodes, a conditional optimal power boosting can be estimated as follows:

$$\begin{bmatrix} b_1(s) \\ \vdots \\ b_N(s) \end{bmatrix} = b(s) = \max\{0, \operatorname{Re}(\operatorname{diag}\{(H^H H)^{-1} H^H y s^H\})\}. \quad \text{Equation 3}$$

Then the best combination of the estimated power boosting and signals hypothesis may be selected using minimum distance criteria:

$$\hat{s} = \underset{s \in S_{QPSK}^{N_i+1}}{\operatorname{argmin}} \left\| y - h_1 \cdot \hat{b}_1(s) s_1 - \sum_{i=2}^{N_i+1} h_i \cdot \hat{b}_i(s) s_i \right\|^2. \quad \text{Equation 4}$$

The second way the receiver circuitry may jointly estimate the power boosting and the serving/interfering signals of PDCCH/EPDCCH without relying on the control channel information related to the interfering cell may be described as follows. For a given signal hypothesis $s = [s1, \ldots, s_{Ni+1}+]$ on serving and interfering nodes, the power boosting may be estimated as follows:

$$\begin{bmatrix} b_1(s) \\ \vdots \\ b_N(s) \end{bmatrix} = b(s) = \max\{0, (\operatorname{Re}(H_s^H H_s))^{-1} \cdot \operatorname{Re}(H_s^H y)\}, \quad \text{Equation 5}$$

where $$H_s = H \cdot \operatorname{diag}(s).$$

Then the best combination of estimated power boosting and signals hypothesis may be selected using minimum distance criteria:

$$\hat{s} = \underset{s \in S_{QPSK}^{N_i+1}}{\operatorname{argmin}} \left\| y - h_1 \cdot \hat{b}_1(s) s_1 - \sum_{i=2}^{N_i+1} h_i \cdot \hat{b}_i(s) s_i \right\|^2. \quad \text{Equation 6}$$

In some embodiments, antenna port cycling may be used for a distributed EPDCCH. For normal cyclic prefix (CP), the EPDCCH may be transmitted using either antenna port 107 or 109 depending on REs selected for EPDCCH transmission. Therefore, when distributed EPDCCH regions of two neighboring cells overlap with each other, the antenna ports 107 and 109 of different cells will collide. Interference randomization in this case may only be achieved by using different scrambling codes for UE-specific RS. However, due to nonorthogonal UE-specific RS of different cells, the channel estimation for serving and/or interfering cells might be inaccurate.

To provide orthogonal UE-specific RS multiplexing on overlapping regions of distributed EPDCCH, embodiments of the present disclosure provide for transmission of UE-specific RS and corresponding EPDCCH on an additional antenna-port pair, for example, antenna ports 108 and 110, which are orthogonal to antenna ports 107 and 109, respectively. Thus, a serving cell may transmit its UE-specific and corresponding EPDCCH on a first antenna-port pair, e.g., AP pair 107/109, and an interfering cell may transmit its UE-specific and corresponding EPDCCH on a second antenna-port pair, e.g., AP pair 108/110. Both cells may use the same scrambling code. Transmitting these signals on orthogonal APs, and using the same scrambling code, may provide an orthogonality between the serving and interfering signals that will facilitate cancellation of interference.

In some embodiments, a UE may determine whether UE-specific RS and corresponding EPDCCH of the serving and/or interfering cells is transmitted on a first antenna port pair, for example, antenna port pair 107/109, or a second antenna port pair, for example, antenna-port pair 108/110. In some embodiments, the control channel information may include an indication of the antenna-port pair, e.g., 107/109 or 108/110, used for UE-specific RS and EPDCCH transmission of the serving and/or interfering cells. In other embodiments, the receiver circuitry may blindly detect the appropriate antenna-port pair during reception of an EPDCCH.

Upon determining the AP pair used for UE-specific RS and the EPDCCH of the serving and/or interfering cells, the UE may estimate serving and interfering channels and jointly decode a serving and interfering EPDCCH based on the estimated channels, as described above.

In some embodiments, operation of the receiver circuitry may be facilitated by signaling of PHICH resource elements of interfering cells. The resource elements (more precisely resource elements groups (REG)) of the first L OFDM symbols of the downlink subframe (where L=1, 2, 3 or 4) are typically shared by the CRS and three physical control channels such as PDCCH, PHICH and PCFICH. See, for example, FIG. 7. PDCCH may be used to convey UL/DL scheduling assignments, PCFICH may be used to indicate the size of the control region (or, equivalently, the PDSCH starting symbol), and PHICH may be used for the acknowledgment/negative acknowledgment feedback for physical uplink shared channel (PUSCH) transmissions.

The resource elements of the first L OFDM symbols that do not carry CRSs may be allocated to the control channels in the following order: PCFICH, PHICH, and PDCCH. The signals used to modulate control channels may be based on the QPSK constellation (note that the PHICH may use two out of four symbols in QPSK). Such modulation structure of the control channel signals can be leveraged by the receiver circuitry for better suppression of the interference from the neighboring cell(s). However, for PHICH, multiple PHICHs messages can be mapped on the same resource elements (or REGs). Therefore, the resulting PHICH signal (after multiplexing of multiple PHICHs) transmitted by a given cell may not be described by the QPSK constellation anymore. In order to avoid potential performance degradation due to mismatch between the actual interference structure and interference structure assumed by the UE receiver (e.g., interfering signals are QPSK), some embodiments provide that the control channel information provide an indication of mapping parameters of an interfering PHICH. The receiver circuitry may use these mapping parameters to determine the resource elements (resource element groups within first L OFDM symbols of the downlink subframes) that can be used for PHICH transmissions by an interfering cell. The receiver circuitry may then know to use a non-QPSK constellation in the estimation of the interference profile of the REs associated with the interfering PHICH.

The mapping parameters may include a PHICH duration parameter that defines a number of OFDM symbols used to carry the PHICH. The PHICH duration may be either normal or extended. A normal PHICH duration causes the PHICH to be present in only the first OFDM symbol. An extended PHICH duration causes the PHICH to be present in the first two or three OFDM symbols.

In some embodiments, the PHICH duration may depend on whether a subframe has a multicast-broadcast single-frequency network (MBSFN) subframe configuration or non-MBSFN subframe configuration. Therefore, in some embodiments the mapping parameters may further include an MBSFN subframe configuration parameter. In some embodiments, the PHICH duration may be configurable by higher layer signaling, for example, RRC signaling, according to Table 1.

TABLE 1

| PHICH duration | Non-MBSFN subframes | | MBSFN subframes on a carrier supporting PDSCH |
|---|---|---|---|
| | Subframes 1 and 6 in case of frame structure type 2 | All other cases | |
| Normal | 1 | 1 | 1 |
| Extended | 2 | 3 | 2 |

The mapping parameters may additionally/alternatively include a number of PHICH groups for the interfering PHICH. The number of PHICH groups may be configurable by parameters $N_g$. For frame structure type 1, the number of PHICH groups $N_{PHICH}^{group}$ may be constant in all subframes and given by $$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}, \quad \text{Equation 7}$$

where $N_g \in \{1/6, 1/2, 1, 2\}$ is provided by higher layers. The index $n_{PHICH}^{group}$ may range from 0 to $N_{PHIC}^{group}-1$.

For frame structure type 2, the number of PHICH groups may vary between downlink subframes and may be given by $m_i \cdot N_{PHICH}^{group}$ where $m_i$ is given by Table 2 and $N_{PHICH}^{group}$ by Equation 7. The index $n_{PHICH}^{group}$ in a downlink subframe with non-zero PHICH resources may range from 0 to $m_i \cdot N_{PHICH}^{group}-1$.

TABLE 2

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

In some embodiments, PHICH groups may be mapped to the resource elements based on a physical cell identifier (ID) $N_{ID}^{cell}$. Accordingly, the mapping parameters may additionally/alternatively include CRS parameters of an interfering cell such as physical cell ID and number of antenna ports so that the UE may be able to determine the REs that can be occupied by the PHICH.

In some embodiments, at least some of the mapping parameters may be derived by overhearing PBCH transmissions from the interfering cell and detecting physical cell ID $N_{ID}^{cell}$ and number of antenna ports from the CRS transmitted by interfering cell.

A UE and/or access node described herein may be implemented into a system using any suitable hardware and/or software to configure as desired. FIG. 9 illustrates, for one embodiment, an example system 900 comprising radio frequency (RF) circuitry 904, baseband circuitry 908, application circuitry 912, memory/storage 916, display 920, camera 924, sensor 928, and input/output (I/O) interface 932, coupled with each other at least as shown.

The application circuitry 912 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 916 and configured to execute instructions stored in the memory/storage 916 to enable various applications and/or operating systems running on the system 900.

The baseband circuitry 908 may include circuitry such as, but not limited to, one or more single-core or multi-core processors such. The processor(s) may include a baseband processor. The baseband circuitry 908 may handle various radio control functions that enables communication with one or more radio networks via the RF circuitry. The radio control functions may include, but not limited to, signal modulation, encoding, decoding, radio frequency shifting, etc. In some embodiments, the baseband circuitry 908 may provide for communication compatible with one or more radio technologies. For example, in some embodiments, the baseband circuitry 908 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 908 is configured to support radio communications of more than one wireless protocol may be referred to as multi-mode baseband circuitry.

In various embodiments, baseband circuitry 908 may include circuitry to operate with signals that are not strictly considered as being in a baseband frequency. For example, in some embodiments, baseband circuitry 908 may include circuitry to operate with signals having an intermediate frequency, which is between a baseband frequency and a radio frequency.

RF circuitry 904 may enable communication with wireless networks using modulated electromagnetic radiation through a non-solid medium. In various embodiments, the RF circuitry 904 may include switches, filters, amplifiers, etc. to facilitate the communication with the wireless network.

In various embodiments, RF circuitry 904 may include circuitry to operate with signals that are not strictly considered as being in a radio frequency. For example, in some embodiments, RF circuitry 904 may include circuitry to operate with signals having an intermediate frequency, which is between a baseband frequency and a radio frequency.

In some embodiments, some or all of the constituent components of the baseband circuitry 908, the application circuitry 912, and/or the memory/storage 916 may be implemented together on a system on a chip (SOC).

In an embodiment in which the system 900 represents an access node, for example, access node 300, the communication circuitry of the access node may be implemented in the RF circuitry 904 and/or the baseband circuitry 908 and the configuration and control circuitry may be implemented in the baseband circuitry 908 and/or application circuitry 912.

In an embodiment in which the system 900 represents a UE, for example, UE 200, the components of the UE, for example, communication circuitry, channel determination circuitry, and interference estimation circuitry, may be implemented in the RF circuitry 904 and/or the baseband circuitry 908.

Memory/storage 916 may be used to load and store data and/or instructions, for example, for system 900. Memory/storage 916 for one embodiment may include any combination of suitable volatile memory (e.g., dynamic random access memory (DRAM)) and/or non-volatile memory (e.g., Flash memory).

In various embodiments, the I/O interface 932 may include one or more user interfaces designed to enable user interaction with the system 900 and/or peripheral component interfaces designed to enable peripheral component interaction with the system 900. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments sensor 928 may include one or more sensing devices to determine environmental conditions and/or location information related to the system 900. In some embodiments, the sensors may include, but are not limited to, a gyro sensor, an accelerometer, a proximity sensor, an ambient light sensor, and a positioning unit. The positioning unit may also be part of, or interact with, the baseband circuitry 908 and/or RF circuitry 904 to communicate with components of a positioning network, e.g., a global positioning system (GPS) satellite.

In various embodiments, the display 920 may include a display (e.g., a liquid crystal display, a touch screen display, etc.).

In various embodiments, the system 900 may be a mobile computing device such as, but not limited to, a laptop computing device, a tablet computing device, a netbook, an ultrabook, a smartphone, etc. In various embodiments, system 900 may have more or less components, and/or different architectures.

The following paragraphs describe examples of various embodiments.

Example 1 includes an apparatus comprising: communications circuitry to receive, from an access node, power boosting information related to control channels of serving and/or interfering cells; and receiver circuitry coupled with the communications circuitry, the receiver circuitry to: determine an extended quadrature phase shift keying (QPSK) constellation based on the power boosting information; and jointly decode serving and interfering control channels based on the extended QPSK constellation.

Example 2 includes the apparatus of example 1, wherein the receiver circuitry is to jointly decode the serving and interfering control channels by being configured to: estimate an interference profile associated with the interfering control channel; and process a received signal based on the interference profile.

Example 3 includes the apparatus of example 1, wherein the receiver circuitry is to jointly decode the serving and interfering control channels by being configured to: utilize a maximum likelihood decoding algorithm to perform a search over discrete signals of the extended QPSK constellation for serving and interfering signals.

Example 4 includes the apparatus of example 1, wherein the communications circuitry is to receive power boosting information by being configured to: receive, from a serving access node, a power boosting set, having one or more boosting values, for a physical downlink control channel (PDCCH)/enhanced physical downlink control channel (EPDCCH), physical hybrid ARQ indicator channel (PHICH), and/or physical control format indicator channel (PCFICH) of the serving cell, and a power boosting set for a PDCCH/EPDCCH, PHICH, and/or PCFICH of the interfering cell.

Example 5 includes the apparatus of example 1, wherein the communications circuitry is to receive one or more boosting values using radio resource control signals.

Example 6 includes the apparatus of example 5, wherein the one or more boosting values include energy per resource element (EPRE) ratios between a physical downlink control channel (PDCCH)/enhanced physical downlink control channel (EPDCCH), physical hybrid ARQ indicator channel (PHICH), and/or physical control format indicator channel (PCFICH) of the serving cell, and a power boosting set for a PDCCH/EPDCCH, PHICH, and/or PCFICH of the interfering cell.

Example 7 includes the apparatus of any of examples 1-6, wherein the boosting information includes a first boosting set for a first orthogonal frequency division multiplexing (OFDM) symbol of a control region and a second boosting set for a second OFDM symbol of the control region.

Example 8 includes user equipment comprising: a multimode baseband circuitry including: first circuitry having the apparatus of example 1 to communicate with a radio access network that utilizes a long term evolution (LTE) protocol; and second circuitry to communicate with a wireless network that utilizes a wireless protocol that is different from the LTE protocol.

Example 9 includes a method comprising: receiving, from an access node of a serving cell, control region loading information of an interfering cell; selecting a receiver function from a plurality of receiver functions based on the control region loading information; and decoding a PDCCH/EPDCCH of the serving cell using the receiver function.

Example 10 includes the method of example 9, wherein control region loading information comprises an indication of an average number of resource elements of a control region of a radio frame of the interfering cell that are used for control channel or reference signal transmissions.

Example 11 includes the method of example 9, wherein control region loading information comprises an indication of an average ratio of resource elements of a control region of a radio frame of the interfering cell that are used for control channel or reference signal transmissions to a total number of resource elements in the control region.

Example 12 includes the method of any of examples 9-11, wherein selecting a receiver function from a plurality of receiver functions includes selecting a log-likelihood ratio (LLR) function from a plurality of LLR functions.

Example 13 includes method of example 12, wherein the receiver function is an optimized receiver function to a mismatched interference assumption.

Example 14 includes or more non-transitory computer-readable media having instructions that, when executed, cause a user equipment to: estimate a power boosting of a serving physical downlink control channel (PDCCH)/enhanced physical downlink control channel (EPDCCH); estimate a power boosting of an interfering PDCCH/EPDCCH; and jointly decode the serving and the interfering PDCCH/EPDCCH based on the estimated power boostings of the serving and the interfering PDCCH/EPDCCH.

Example 15 includes one or more non-transitory computer-readable media of example 14, wherein estimating the power boosting of the serving and interfering PDCCH/EPDCCHs is based on:

$$\begin{bmatrix} b_1(s) \\ \vdots \\ b_N(s) \end{bmatrix} = b(s) = \max\{0, \operatorname{Re}(\operatorname{diag}\{(H^H H)^{-1} H^H y s^H\})\},$$

where N is a number of interfering cells, b1(s) is a power boosting of the serving PDCCH/EPDCCH, b2(s), . . . , bN(s) is power boosting on interfering PDCCH/EPDCCHs, and H is a composite channel that equals $h_1, \ldots, h_{N\_i+1}$, where $h_1$ is an equivalent channel for a serving node, $h_2, \ldots, h_{N\_i+1}$ are equivalent channels for interfering nodes.

Example 16 includes the one or more non-transitory computer-readable media of example 14, wherein the instructions, when executed, further cause the UE, for a given signal hypothesis of $s=[s_1, \ldots, s_{Ni+1}]$ on serving and interfering cells, to: jointly decode the serving and the interfering PDCCH/EPDCCH using a minimum distance criteria:

$$\hat{s} = \underset{s \in S_{QPSK}^{N_i+1}}{\operatorname{argmin}} \left\| y - h_1 \cdot \hat{b}_1(s)s_1 - \sum_{i=2}^{N_i+1} h_i \cdot \hat{b}_i(s)s_i \right\|^2.$$

Example 17 includes the one or more non-transitory computer-readable media of example 14, wherein estimating the power boosting of the serving and interfering PDCCH/EPDCCHs is based on:

$$\begin{bmatrix} b_1(s) \\ \vdots \\ b_N(s) \end{bmatrix} = b(s) = \max\{0, (\operatorname{Re}(H_s^H H_s))^{-1} \cdot \operatorname{Re}(H_s^H y)\},$$

where N is a number of interfering cells, $b_1(s)$ is a power boosting of the serving PDCCH/EPDCCH, $b_2(s), \ldots, b_N(s)$ is power boosting on interfering PDCCH/EPDCCHs, and $H_s = H \cdot \operatorname{diag}(s)$, H is a composite channel that equals $h_1, \ldots, h_{N\_i+1}$, where $h_1$ is an equivalent channel for a serving node, $h_2, \ldots, h_{N\_i+1}$ are equivalent channels for interfering nodes.

Example 18 includes the one or more non-transitory computer-readable media of example 17, wherein the instructions, when executed, further cause the UE, for a given signal hypothesis of $s=[s_1, \ldots, s_{Ni+1}]$ on serving and interfering cells, to: jointly decode the serving and the interfering PDCCH/EPDCCH using a minimum distance criteria:

$$\hat{s} = \underset{s \in S_{QPSK}^{N_i+1}}{\mathrm{argmin}} \left\| y - h_1 \cdot \hat{b}_1(s)s_1 - \sum_{i=2}^{N_i+1} h_i \cdot \hat{b}_i(s)s_i \right\|^2.$$

Example 19 includes a method comprising: determining whether a user equipment (UE)-specific reference signal (RS) and a corresponding enhanced physical downlink control channel (EPDCCH) for an interfering cell is transmitted on a first antenna port pair or a second antenna port pair; and estimating an interfering channel based on the determination of whether the UE-specific RS and corresponding EPDCCH is transmitted on the first antenna-port pair or the second antenna-port pair.

Example 20 includes the method of example 19, further comprising:

receiving control channel information from a serving access node; and determining whether the UE-specific RS and the corresponding EPDCCH is transmitted on the first antenna-port pair or the second antenna-port pair based on the control channel information.

Example 21 includes the method of example 19, further comprising: blindly detecting the corresponding EPDCCH; and determining whether the UE-specific RS and the corresponding EPDCCH is transmitted on the first antenna-port pair or the second antenna-port pair based on the blindly detecting of the corresponding EPDCCH.

Example 22 includes the method of any of examples 19-21, wherein the first antenna-port pair is antenna ports 107 and 109 and the second antenna port pair is antenna ports 108 and 110.

Example 23 includes an apparatus comprising: communications circuitry to receive, from an access node, an indication of mapping parameters of an interfering physical hybrid-automatic repeat request indicator channel (PHICH); and receiver circuitry coupled with the communications circuitry, the receiver circuitry to: estimate an interference profile associated with the interfering PHICH; and process a received signal based on the interference profile.

Example 24 includes the apparatus of example 23, wherein the mapping parameters include: a PHICH duration parameter that defines a number of orthogonal frequency division multiplexing (OFDM) symbols used to carry the interfering PHICH; a multicast-broadcast single-frequency network (MBSFN) subframe configuration parameter; a number of PHICH groups for the interfering PHICH; and/or a physical cell identifier of an interfering cell that provides the interfering PHICH.

Example 25 includes the apparatus of any of examples 23-24, wherein the receiver circuitry is to: determine the resource elements that can be used for interfering PHICH based on the indication of mapping parameters; and use a non-quadrature phase shift keying (QPSK) constellation in the estimation of the interference profile of the resource elements.

Example 26 includes a method comprising: receiving, from an access node, power boosting information related to control channels of serving and/or interfering cells; determining an extended quadrature phase shift keying (QPSK) constellation based on the power boosting information; and jointly decoding serving and interfering control channels based on the extended QPSK constellation.

Example 27 includes the method of example 26, wherein jointly decoding the serving and interfering control channels comprises: estimating an interference profile associated with the interfering control channel; and processing a received signal based on the interference profile.

Example 28 includes the method of example 26, wherein jointly decoding the serving and interfering control channels comprises: utilizing a maximum likelihood decoding algorithm to perform a search over discrete signals of the extended QPSK constellation for serving and interfering signals.

Example 29 includes the method of example 26, wherein the receiving power boosting information comprises receiving, from a serving access node, a power boosting set, having one or more boosting values, for a physical downlink control channel (PDCCH)/enhanced physical downlink control channel (EPDCCH) of the serving cell, and a power boosting set for a PDCCH/EPDCCH of the interfering cell.

Example 30 includes the method of example 26, wherein the receiving comprises receiving one or more boosting values using radio resource control signals.

Example 31 includes the method of example 30, wherein the one or more boosting values include energy per resource element (EPRE) ratios between a physical downlink control channel (PDCCH)/enhanced physical downlink control channel (EPDCCH), physical hybrid ARQ indicator channel (PHICH), and/or physical control format indicator channel (PCFICH) of the serving cell, and a power boosting set for a PDCCH/EPDCCH, PHICH, and/or PCFICH of the interfering cell.

Example 32 includes the method of any of examples 26-31, wherein the boosting information includes a first boosting set for a first orthogonal frequency division multiplexing (OFDM) symbol of a control region and a second boosting set for a second OFDM symbol of the control region.

Example 33 includes a method comprising: receiving, at a serving access node from an interfering access node, control channel information corresponding to an interfering cell; and transmitting, from the serving access node, the control channel information to one or more user equipments (UEs) in a serving cell, wherein the control channel information includes power boosting information, control region loading information, or an indication of one or more antenna ports used to transmit an enhanced physical downlink control channel (EPDCCH).

Example 34 includes the method of example 33, further comprising: transmitting, from the serving access node, control channel information corresponding to a serving cell, wherein the control channel information corresponding to the serving cell includes power boosting information, control region loading information, or an indication of one or more antenna ports used to transmit an EPDCCH.

Example 35 includes an access node configured to perform the method of any of examples 33-34.

Example 36 includes an apparatus comprising: means for receiving, from an access node of a serving cell, control region loading information of an interfering cell; means for selecting a receiver function from a plurality of receiver functions based on the control region loading information; and means for decoding a PDCCH/EPDCCH of the serving cell using the receiver function.

Example 37 includes the apparatus of claim 36, wherein control region loading information comprises an indication of an average number of resource elements of a control region of a radio frame of the interfering cell that are used for control channel or reference signal transmissions.

Example 38 includes the apparatus of claim 36, wherein control region loading information comprises an indication of an average ratio of resource elements of a control region of a radio frame of the interfering cell that are used for control channel or reference signal transmissions to a total number of resource elements in the control region.

Example 39 includes the apparatus of any of claims 36-38, wherein means for selecting a receiver function from a plurality of receiver functions includes means for selecting a log-likelihood ratio (LLR) function from a plurality of LLR functions.

Example 40 includes the apparatus of claim 39, wherein the receiver function is an optimized receiver function to a mismatched interference assumption.

Example 41 includes an apparatus to be employed in a user equipment, the apparatus comprising: means to estimate a power boosting of a serving physical downlink control channel (PDCCH)/enhanced physical downlink control channel (EPDCCH); means to estimate a power boosting of an interfering PDCCH/EPDCCH; and means to jointly decode the serving and the interfering PDCCH/EPDCCH based on the estimated power boostings of the serving and the interfering PDCCH/EPDCCH.

Example 42 includes the apparatus of example 41, wherein means to estimate the power boosting of the serving and interfering PDCCH/EPDCCHs is based on:

$$\begin{bmatrix} b_1(s) \\ \vdots \\ b_N(s) \end{bmatrix} = b(s) = \max\{0, \operatorname{Re}(\operatorname{diag}\{(H^H H)^{-1} H^H y s^H\})\},$$

where N is a number of interfering cells, $b_1(s)$ is a power boosting of the serving PDCCH/EPDCCH, $b_2(s), \ldots, b_N(s)$ is power boosting on interfering PDCCH/EPDCCHs, and H is a composite channel that equals $h_1, \ldots, h_{N\_i+1}$, where $h_1$ is an equivalent channel for a serving node, $h_2, \ldots, h_{N\_i+1}$, are equivalent channels for interfering nodes.

Example 43 includes the apparatus of example 41, wherein, for a given signal hypothesis of $s=[s_1, \ldots, s_{Ni+1}]$ on serving and interfering cells, the apparatus further includes:
means to jointly decode the serving and the interfering PDCCH/EPDCCH using a minimum distance criteria:

$$\hat{s} = \operatorname*{argmin}_{s \in S_{QPSK}^{N_i+1}} \left\| y - h_1 \cdot \hat{b}_1(s) s_1 - \sum_{i=2}^{N_i+1} h_i \cdot \hat{b}_i(s) s_i \right\|^2.$$

Example 44 includes the apparatus of example 41, wherein means to estimate the power boosting of the serving and interfering PDCCH/EPDCCHs is based on:

$$\begin{bmatrix} b_1(s) \\ \vdots \\ b_N(s) \end{bmatrix} = b(s) = \max\{0, (\operatorname{Re}(H_s^H H_s))^{-1} \cdot \operatorname{Re}(H_s^H y)\},$$

where N is a number of interfering cells, $b_1(s)$ is a power boosting of the serving PDCCH/EPDCCH, $b_2(s), \ldots, b_N(s)$ is power boosting on interfering PDCCH/EPDCCHs, and $H_s$=H·diag(s), H is a composite channel that equals $h_1, \ldots, h_{N\_i+1}$, where $h_1$ is an equivalent channel for a serving node, $h_2, \ldots, h_{N\_i+1}$ are equivalent channels for interfering nodes.

Example 45 includes apparatus of example 44, wherein, for a given signal hypothesis of $s=[s_1, \ldots, s_{Ni+1}]$ on serving and interfering cells, the apparatus further includes:
means to jointly decode the serving and the interfering PDCCH/EPDCCH using a minimum distance criteria:

$$\hat{s} = \operatorname*{argmin}_{s \in S_{QPSK}^{N_i+1}} \left\| y - h_1 \cdot \hat{b}_1(s) s_1 - \sum_{i=2}^{N_i+1} h_i \cdot \hat{b}_i(s) s_i \right\|^2.$$

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. An apparatus comprising:
communications circuitry to receive, from an access node using radio resource control signals, power boosting information comprising one or more boosting values related to control channels of serving and interfering cells, wherein the one or more boosting values include energy per resource element (EPRE) ratios between a physical downlink control channel (PDCCH)/enhanced physical downlink control channel (EPDCCH) and reference signals of the PDCCH/EPDCCH for both the serving and interfering cells; and
receiver circuitry coupled with the communications circuitry, the receiver circuitry to:
determine an extended quadrature phase shift keying (QPSK) constellation based on the power boosting information for selection of desired combinations of the PDCCH/EPDCCH from the serving and interfering cells, wherein the QPSK constellation is to indicate possible signal points that can be used on the serving and interfering cells given the power boosting information relative to the reference signals of the PDCCH/EPDCCH; and
jointly decode serving and interfering control channels based on the extended QPSK constellation, wherein to jointly decode, the receiver circuitry is to use a decoding algorithm to perform a search over discrete signals of the extended QPSK constellation for the serving and interfering cells.

2. The apparatus of claim 1, wherein, to jointly decode the serving and interfering control channels, the receiver circuitry is to:
estimate an interference profile associated with the interfering control channel; and
process a received signal based on the interference profile.

3. The apparatus of claim 1, wherein, to jointly decode the serving and interfering control channels, the receiver circuitry is to:
utilize a maximum likelihood decoding algorithm to perform a search over discrete signals of the extended QPSK constellation for serving and interfering signals.

4. The apparatus of claim 1, wherein, to receive the power boosting information, the communications circuitry is to:
receive, from a serving access node, a power boosting set, having one or more boosting values, for the PDCCH/EPDCCH, physical hybrid automatic repeat request indicator channel (PHICH), and/or physical control format indicator channel (PCFICH) of the serving cell, and a power boosting set for the PDCCH/EPDCCH, PHICH, and/or PCFICH of the interfering cell.

5. The apparatus of claim 1, wherein the boosting information includes a first boosting set for a first orthogonal frequency division multiplexing (OFDM) symbol of a control region and a second boosting set for a second OFDM symbol of the control region.

6. A user equipment comprising:
a multi-mode baseband circuitry including:
  first circuitry having the apparatus of claim 1 to communicate with a radio access network that utilizes a long term evolution (LTE) protocol; and
  second circuitry to communicate with a wireless network that utilizes a wireless protocol that is different from the LTE protocol.

7. The apparatus of claim 1, wherein the power boosting information is to provide an indication that a power level used in control channel transmissions is increased relative to other control channel transmissions.

* * * * *